Patented July 14, 1936

2,047,497

UNITED STATES PATENT OFFICE 2,047,497

PACKING MATERIAL

Ernst Studt, Nordenham, Germany, assignor to Norddeutsche Seekabelwerke Aktiengesellschaft, Nordenham, Germany No Drawing. Application February 8, 1935, Serial No. 5,685. In Germany February 28, 1934

1 Claim. (Cl. 18—57)

In the concurrent application, Serial No. 693,213, I have described a method of manufacturing bands and foils which are bendable and yielding in every direction from polymerization products of aryl olefines, more particularly polystyrol. It has been found that thin foils of polystyrol or the like obtained according to the method described in the said patent are especially suitable for use as a packing material for comestibles, tobacco products or other materials which are sensitive to moisture. As compared with cellulose skins used for the same purpose, foils of polystyrol or the like have the advantage that they are entirely insensitive to moisture, whilst cellulose skin absorbs small amounts of moisture and thereby loses its smooth surface. In contradistinction thereto, foils of polystyrol retain their smooth surface also in moist surroundings. Moreover, foils according to the invention can be manipulated in the same simple manner as foils of cellulose skin.

An especially advantageous method of manufacturing thin foils of polystyrol or the like consists in that the heated mass is pressed out through an annular nozzle and the tube which is thereby produced is drawn over a stretching device provided at the centre piece of the nozzle. The stretching device may consist of two guiding runners which cause the tube of polystyrol to be gradually widened as it is being drawn out.

The sticking of the foils of polystyrol or the like can be effected in a very simple manner by moistening their surface with benzene or mixtures of benzene with benzine or alcohol.

What I claim is:

A packing material for goods sensitive to moisture, consisting of bendable foils obtained by longitudinal and transverse stretching of sheet-like structures of polystyrol.

ERNST STUDT.